(No Model.)
R. FRYER.
DRIVING GEAR FOR BICYCLES.
No. 506,685. Patented Oct. 17, 1893.
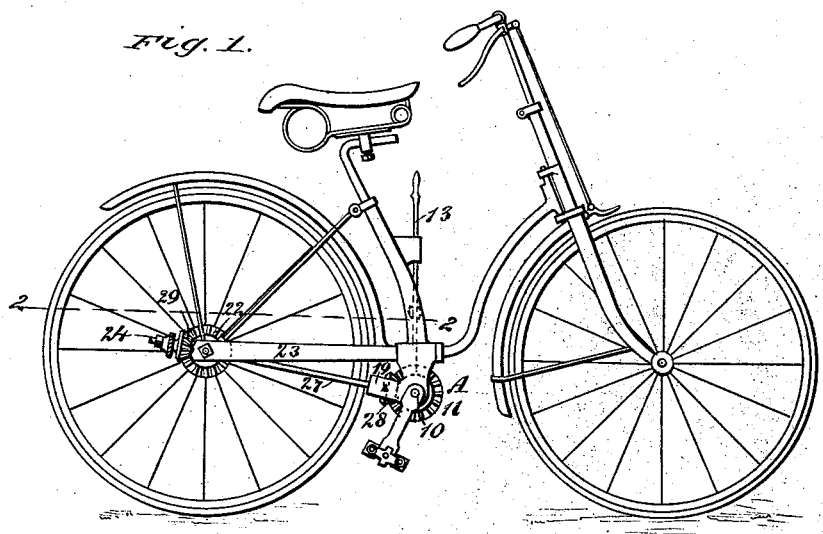
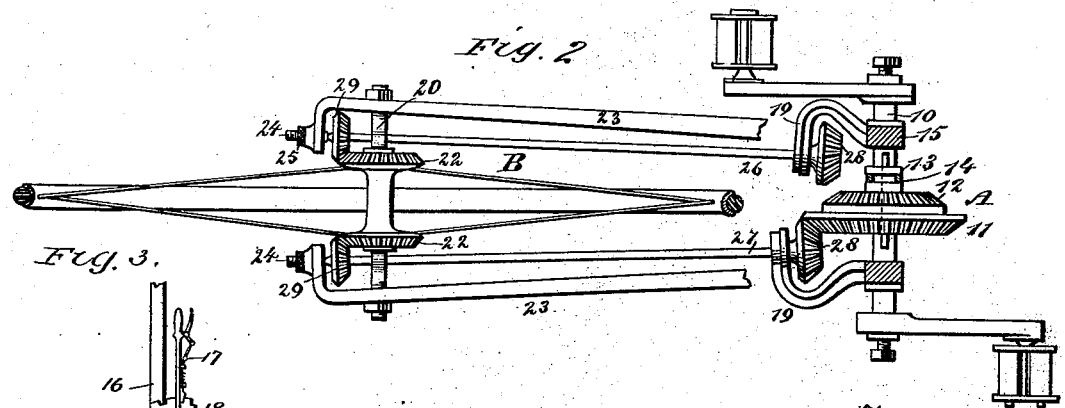
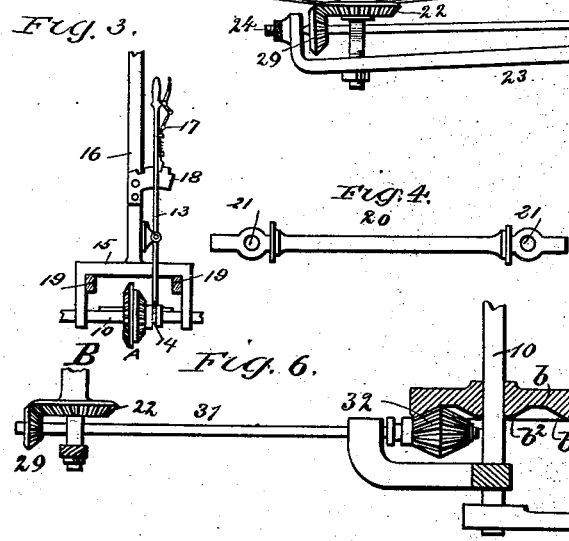
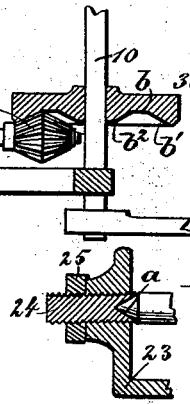
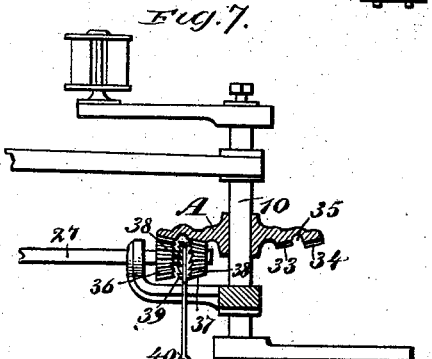
WITNESSES:
W. R. Davie
C. Sedgwick
INVENTOR:
R. Fryer
BY Munn & Co
ATTORNEYS

UNITED STATES PATENT OFFICE.

RICHARD FRYER, OF WAUPUN, WISCONSIN, ASSIGNOR TO CHARLES G. PERKINS, OF HARTFORD, CONNECTICUT.

DRIVING-GEAR FOR BICYCLES.

SPECIFICATION forming part of Letters Patent No. 506,685, dated October 17, 1893.

Application filed June 3, 1891. Renewed November 12, 1892. Serial No. 451,795. (No model.)

*To all whom it may concern:*

Be it known that I, RICHARD FRYER, of Waupun, in the county of Dodge and State of Wisconsin, have invented a new and Improved Driving-Gear for Bicycles, of which the following is a full, clear, and exact description.

My invention relates to an improvement in the driving mechanism for bicycles and like machines, and has for its object to provide a system of gearing between the pedal or crank shaft and the driving wheel capable of convenient manipulation to speed the machine at a high rate of speed, or to slacken the speed and increase the power; and a further object of the invention is to provide a means whereby the pedal shaft and drive wheel may be instantly disconnected for purposes of coasting or running down hill, or for like maneuvers in which the machine is to be allowed to run free.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the bicycle, having the improvement applied thereto, in single form. Fig. 2 is a plan view of the same partially in section, the forward or steering wheel being omitted and the section taken practically on the line 2—2 of Fig. 1. Fig. 3 is a detail view of a shifting lever and its connection with the gearing. Fig. 4 is a detail view of the axle of the driving wheel. Fig. 5 is a sectional detail view of a bearing for one of the side driving shafts, said bearing constituting a portion of the frame of the bicycle. Fig. 6 is a detail view of a modification in the gearing, the said gearing appearing in plan, and Fig. 7 is a similar view of a further modification.

The driving mechanism shown in Figs. 1 and 2, is constructed and arranged in the following manner: Upon the pedal or crank shaft 10, a double faced bevel gear A, is splined, the said gear being adapted to turn with the crank or pedal shaft and slide thereon. The gear comprises two integral sections 11 and 12, the section 11 being of greater diameter than the section 12, and the beveled teeth of each section are made to face outward in the direction of the sides of the machine. A shifting lever 13, is employed in connection with this double gear, the lower end of which lever is made to engage preferably with an annular groove 14, produced in the hub of the gear, as shown in Fig. 3. The lever may be attached to the frame in a manner to be adjacent to the steering handles of the machine, but in the drawings I have illustrated a bearing 15 of the crank or pedal shaft as yoke shaped and provided with an upright 16, upon which upright the lever 13, is fulcrumed; and the lever is shown as provided with the usual thumb latch 17, engaging with a rack 18 upon the upright, but the construction of the shifting lever may be changed at will. From the vertical members of the yoke bearing 15 two horizontal hangers 19, are rearwardly projected, the said hangers being made to approximate in general contour the letter L, as they are curved outward from the members of the yoke bearing and thence inward in the direction of each other, as is best shown in Fig. 2. The axle 20, upon which the hub of the driving wheel B, is loosely mounted, is preferably provided near its extremities with apertures 21; and upon each end face of the hub of the driving wheel a beveled gear 22, is formed or attached.

The side framing 23 of the bicycle extends back of the axle 20; and the rear extremities of said framing are bent inward in direction of each other substantially parallel with the axle; and at the extremities of each side framing 23, a threaded aperture is made, which extends through from one face to the other and is adapted to receive a threaded stud 24, the inner end whereof is provided with a recess preferably of conical form, as shown in Fig. 5; and the stud may be carried inward in direction of the axle, or outward therefrom, through the medium of a thumb nut 25, located upon its outer end.

In the hangers 19, the forward ends of longitudinal shafts 26 and 27, are respectively journaled. The rear ends of these shafts pass through the openings or apertures 21 in the axle, and their extremities are conically shaped, as illustrated at $a$, in Fig. 5, to enter the threaded recesses in the post or stud 24, likewise shown in the same figure.

The longitudinal shafts 26 and 27, are not horizontal, as they incline downward from the axle in the direction of the front, as is shown in Fig. 1. Each longitudinal shaft, which may be called a line or drive shaft, is provided at its forward end with a bevel pinion 28, and at its rear end with a smaller pinion 29 of the same character. The pinions 29, are in constant engagement with the bevel gear 22 upon the hub of the drive wheel B; but the forward pinions 28, are adapted to be alternately engaged by the double faced gear wheel A, the section 11 of said wheel being adapted to mesh with one pinion, and the section 12, with the opposite pinion.

I desire it to be distinctly understood that if in practice it is found desirable, the line or drive shafts 26 and 27 need not be passed through apertures in the axle, but may be journaled in boxes or hangers of any suitable description projected downward from the axle or from the framing of the machine when its construction will admit.

In the operation of the mechanism as shown in Figs. 1 and 2, if it is desired to speed the machine, the shifting lever 13, is manipulated to carry the double faced gear A in a direction to cause the teeth of its larger section 11 to engage with the adjacent pinion 28 upon the drive or line shaft 27. If it is desired to slaken the speed and increase in power, as would be necessary, for instance, in hill climbing, or in passing over undulating ground, the double faced gear is manipulated in a manner to cause the teeth of its smaller section 12, to engage with the pinion of the opposite line or drive shaft 26. When, however, it is desired to permit the machine to run free, that is to disconnect the pedal shaft from the driving wheel, the double faced gear is carried to a position intermediate of the two pinions 28 and out of engagement with each. The hangers 19 afford convenient foot rests when the feet of the rider are removed from the pedals.

With reference to the modification shown in Fig. 6, when such construction is employed, but one line or drive shaft is inserted to connect the driving wheel and the pedal or crank shaft, but the same results may be attained as described in connection with the construction shown in Figs. 1 and 2.

In the modified form of the invention, a wheel 30, is secured upon the crank or pedal shaft 10, the outer face of which wheel is provided with an essentially angular groove $b$, substantially V-shaped in cross section and centrally located, whereby two reverse inclined surfaces $b'$ and $b^2$, are formed, each of said surfaces having beveled teeth formed thereon; and the beveled surfaces of the wheel 30, correspond to the beveled surfaces of the wheel A. The single line shaft 31, is provided, as in the form of construction described, with a pinion 29, meshing with a bevel gear 22, upon the hub of the driving wheel, the forward end of the shaft being provided with a bevel gear 32, splined thereon and capable of lateral movement, which bevel gear is inclined from its center in direction of its ends, and the inclined surfaces are toothed. Thus, when it is desired to speed the machine, the rear beveled surface is brought into engagement with the bevel surface $b'$ of the wheel 30, which is of greater radius than the opposite surface $b^2$. This engagement is illustrated in Fig. 6.

When it is desired to lessen the speed and increase the power, the forward bevel surface of the bevel pinion 32, is made to mesh with the toothed surface $b^2$ of the drive wheel 30; and when the machine is to run free, the pinion 32, is shifted so as to be out of engagement with both surfaces of the driving wheel. It will be understood that the beveled pinion 32, may be shifted through the medium of any well known or suitable mechanism, the mechanism shown in Fig. 3 being capable of application to that end.

With reference to the modification illustrated in Fig. 7, the driving wheel A, secured upon the crank shaft 10, is provided upon one side with two beveled faces 33 and 34. Both beveled faces are toothed, and the beveled face 34 is of greater radius than the face 33. The bevel of both faces is from the periphery inward, and the two beveled surfaces are separated by a circumferential groove or channel 35. Upon a line shaft 27, driven as heretofore set forth, two beveled or conical pinions 36 and 37, are loosely mounted, a pinion being in constant engagement with each beveled surface of the drive wheel. The opposed ends of the beveled pinions are provided with clutch faces 38, adapted to be engaged by a clutch 39, the said clutch being held to slide upon the shaft between the pinions and turn with the shaft. The clutch is operated through the medium of a shifting lever 40, which preferably leads up to a point at or near the steering handle within convenient reach of the operator or rider.

Either speed or power may be obtained by throwing the clutch 39 in engagement with the outer or the inner of the beveled pinions; and when the clutch is out of engagement with both pinions, which may take place, the machine will run free.

Having thus described my invention, I claim as new and desire to secure by Letters Patent—

1. In a bicycle the combination of a drive wheel having a gear upon its hub, and an axle on which said wheel is mounted, with a frame having a hind fork in which said axle is supported, one arm of said fork extending to the rear of said axle, a pedal shaft carrying a gear, and a line shaft carrying gears at its ends and meshing with the rear of said hub and pedal shaft gears and supported at its rear end by the rear extension of the arm, substantially as described.

2. In a bicycle, the combination of an axle and a frame having a hind fork the arms of which support and extend to the rear of said axle, with a drive wheel having gearing upon its hubs mounted upon said axle, line shafts having their rear ends supported by the rear extensions of said arms, and geared at their rear ends to the rear of the drive wheel gear, and having gears at their forward ends, and a pedal shaft carrying a sliding differential gear and means for sliding said differential gear into engagement with either of the forward line shaft gears, substantially as described.

3. In a bicycle the combination with a suitable frame of a driving wheel having a bevel gear upon its hub, a pedal shaft carrying a bevel gear, and a line shaft carrying a gear meshing with the gear of the pedal shaft and a second gear meshing with the rear of the hub gear, substantially as described.

4. In a bicycle the combination with a suitable frame of a driving wheel having a bevel gear upon its hub, a pedal shaft carrying a bevel gear facing in the same direction as the hub gear and a line shaft carrying gears meshing with the rear of said hub and pedal shaft gears, substantially as described.

5. In a driving mechanism for bicycles or similar machines, the combination, with the driving wheel of the machine, provided with gears attached to its hub at opposite ends, and line shafts located one at each side of the hub of the driving wheel and provided with pinions meshing with the gears of the wheel hub, and also provided with pinions at their opposite ends, of a pedal shaft, a double bevel gear adapted to turn with and capable of sliding upon the pedal shaft, one beveled face of the gear being of greater diameter than the other, each beveled face being turned in the same direction as the face of the corresponding hub gear and a shifting mechanism connected with the double faced gear, whereby it may be made to mesh with a pinion of either line or drive shaft, as and for the purpose set forth.

RICHARD FRYER.

Witnesses:
WALDO G. CHICKERING,
WILLIAM GILDEY.